(12) United States Patent
Kumar et al.

(10) Patent No.: US 12,556,975 B2
(45) Date of Patent: Feb. 17, 2026

(54) MACHINE LEARNING COMPONENT MANAGEMENT

(71) Applicant: QUALCOMM Incorporated, San Diego, CA (US)

(72) Inventors: Rajeev Kumar, San Diego, CA (US); Aziz Gholmieh, Del Mar, CA (US); Gavin Bernard Horn, La Jolla, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 17/821,388

(22) Filed: Aug. 22, 2022

(65) Prior Publication Data

US 2024/0064574 A1    Feb. 22, 2024

(51) Int. Cl.
*H04W 28/18* (2009.01)
*H04W 8/24* (2009.01)
*H04W 24/02* (2009.01)

(52) U.S. Cl.
CPC ............. *H04W 28/18* (2013.01); *H04W 8/24* (2013.01); *H04W 24/02* (2013.01)

(58) Field of Classification Search
CPC ....... H04W 24/02; H04W 28/18; H04W 8/24; G06N 20/00; H04L 41/16
See application file for complete search history.

(56) References Cited

U.S. PATENT DOCUMENTS

| | | | |
|---|---|---|---|
| 2021/0160149 A1 | 5/2021 | Ma et al. | |
| 2022/0116764 A1 | 4/2022 | Pezeshki et al. | |
| 2022/0182802 A1 | 6/2022 | Pezeshki et al. | |
| 2022/0269835 A1* | 8/2022 | Yang | G06N 7/01 |
| 2022/0398365 A1* | 12/2022 | Kumar | G06Q 10/0875 |
| 2023/0075276 A1* | 3/2023 | Zhu | H04W 88/08 |
| 2023/0209390 A1* | 6/2023 | Zeng | H04W 24/02 |
| 2024/0022927 A1* | 1/2024 | Tong | H04W 4/40 |
| 2024/0193481 A1* | 6/2024 | Bucklin | G06N 20/00 |
| 2024/0295625 A1* | 9/2024 | Hasegawa | G01S 5/0263 |
| 2024/0334179 A1* | 10/2024 | Suo | H04W 8/24 |
| 2024/0348663 A1* | 10/2024 | Crabtree | H04L 63/104 |
| 2024/0349082 A1* | 10/2024 | Li | H04W 24/02 |
| 2025/0126444 A1* | 4/2025 | Zhang | H04W 4/30 |

FOREIGN PATENT DOCUMENTS

WO    WO-2022077202 A1    4/2022

OTHER PUBLICATIONS

International Search Report and Written Opinion—PCT/US2023/071727—ISA/EPO—Dec. 4, 2023.

\* cited by examiner

*Primary Examiner* — Congvan Tran
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, UE capability information associated with at least one machine learning component. The UE may receive, from the network node and based on the UE capability information, configuration information corresponding to the at least one machine learning component. The UE may generate a first machine learning output based on the machine learning component. The UE may perform a communication task based on the first machine learning output. Numerous other aspects are described.

30 Claims, 9 Drawing Sheets

MACHINE LEARNING COMPONENT MANAGEMENT

FIELD OF THE DISCLOSURE

Aspects of the present disclosure generally relate to wireless communication and to techniques and apparatuses for machine learning component management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some scenarios, a network node can signal a change in network settings but can be unaware of which settings and/or configurations for which changes a user equipment (UE) should be notified. Without techniques for managing such change notifications, a machine learning component at a UE that is correlated with a machine learning component at the network node, or vice versa, may produce outputs that do not correlate to outputs of the correlated machine learning component and, as a result, may lead to machine-learning-based wireless communication operations that are inefficient or inaccurate, thereby negatively impacting network performance.

Some aspects of the techniques and apparatuses described herein provide for machine learning component management. For example, some aspects include techniques for managing, in different collaboration scenarios, changes to machine learning models, changes to model structures (MSs), activation and/or deactivation of parameter sets (PSs) and/or machine learning components, switching between MSs and/or PSs, and/or fallback operation, among other examples. In some aspects, for example, the UE may transmit UE capability information and/or UE assistance information to the network node that indicates at least one machine learning operating parameter state that is configured to be changed based on a network indication. In some aspects, the network node may transmit, and a UE may receive, a change indication that indicates a change associated with a plurality of machine learning operating parameters. Similarly, a UE may transmit, and the network node may receive, a UE indication that indicates a change associated with a machine learning operating parameter. In this way, a UE and a network node may manage correlated machine learning components so that the outputs of the machine learning components are correlated and useable. Thus, some aspects may facilitate more efficient and/or effective wireless communication tasks, thereby positively impacting network performance.

Some aspects described herein relate to a UE for wireless communication. The UE may include a memory and one or more processors coupled to the memory. The one or more processors may be configured to transmit, to a network node, UE capability information associated with at least one machine learning component. The one or more processors may be configured to receive, from the network node and based on the UE capability information, configuration information corresponding to the at least one machine learning component. The one or more processors may be configured to generate a first machine learning output based on the machine learning component. The one or more processors may be configured to perform a communication task based on the first machine learning output.

Some aspects described herein relate to a network node for wireless communication. The network node may include a memory and one or more processors coupled to the memory. The one or more processors may be configured to receive, from a UE, UE capability information associated with at least one machine learning component. The one or more processors may be configured to transmit, to the UE, configuration information associated with the at least one machine learning component, wherein the configuration information indicates at least one machine learning operating parameter state that is configured to be changed based on a UE indication. The one or more processors may be configured to receive, from the UE, a UE indication associated with the at least one machine learning operating parameter state. The one or more processors may be configured to perform at least one machine learning operation based on receiving the UE indication.

Some aspects described herein relate to a method of wireless communication performed by a UE. The method may include transmitting, to a network node, UE capability information associated with at least one machine learning component. The method may include receiving, from the network node and based on the UE capability information, configuration information corresponding to the at least one machine learning component. The method may include generating a first machine learning output based on the machine learning component. The method may include performing a communication task based on the first machine learning output.

Some aspects described herein relate to a method of wireless communication performed by a network node. The method may include receiving, from a UE, UE capability information associated with at least one machine learning component. The method may include transmitting, to the UE, configuration information associated with at the least one machine learning component, wherein the configuration information indicates at least one machine learning operating parameter state that is configured to be changed based on a UE indication. The method may include receiving, from the UE, a UE indication associated with the at least one machine learning operating parameter state. The method may include performing at least one machine learning operation based on receiving the UE indication.

Some aspects described herein relate to a non-transitory computer-readable medium that stores a set of instructions for wireless communication by a UE. The set of instructions, when executed by one or more processors of the UE, may cause the UE to transmit, to a network node, UE capability information associated with at least one machine learning component. The set of instructions, when executed by one or more processors of the UE, may cause the UE to receive, from the network node and based on the UE capability information, configuration information corresponding to the at least one machine learning component. The set of instructions, when executed by one or more processors of the UE, may cause the UE to generate a first machine learning output based on the machine learning component. The set of instructions, when executed by one or more processors of the UE, may cause the UE to perform a communication task based on the first machine learning output.

Some aspects described herein relate to a non-transitory computer-readable medium that stores a set of instructions for wireless communication by a network node. The set of instructions, when executed by one or more processors of the network node, may cause the network node to receive, from a UE, UE capability information associated with at least one machine learning component. The set of instructions, when executed by one or more processors of the network node, may cause the network node to transmit, to the UE, configuration information associated with at the least one machine learning component, wherein the configuration information indicates at least one machine learning operating parameter state that is configured to be changed based on a UE indication. The set of instructions, when executed by one or more processors of the network node, may cause the network node to receive, from the UE, a UE indication associated with the at least one machine learning operating parameter state. The set of instructions, when executed by one or more processors of the network node, may cause the network node to perform at least one machine learning operation based on receiving the UE indication.

Some aspects described herein relate to an apparatus for wireless communication. The apparatus may include means for transmitting, to a network node, UE capability information associated with at least one machine learning component. The apparatus may include means for receiving, from the network node and based on the UE capability information, configuration information corresponding to the at least one machine learning component. The apparatus may include means for generating a first machine learning output based on the machine learning component. The apparatus may include means for performing a communication task based on the first machine learning output.

Some aspects described herein relate to an apparatus for wireless communication. The apparatus may include means for receiving, from a UE, UE capability information associated with at least one machine learning component. The apparatus may include means for transmitting, to the UE, configuration information associated with at the least one machine learning component, wherein the configuration information indicates at least one machine learning operating parameter state that is configured to be changed based on a UE indication. The apparatus may include means for receiving, from the UE, a UE indication associated with the at least one machine learning operating parameter state. The apparatus may include means for performing at least one machine learning operation based on receiving the UE indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
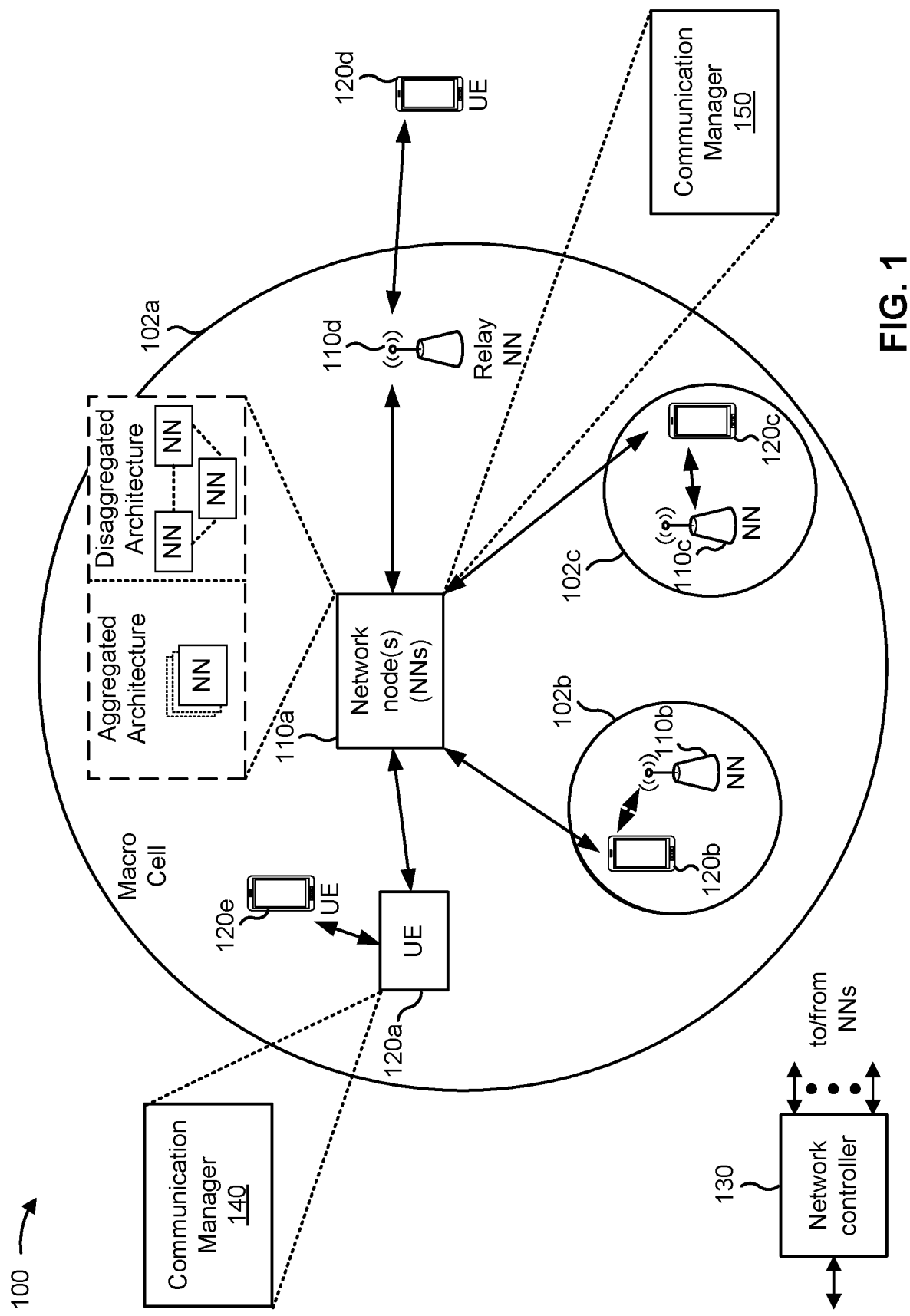
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, UE capability information associated with at least one machine learning component; receive, from the network node and based on the UE capability information, configuration information corresponding to the at least one machine learning component; generate a first machine learning output based on the machine learning component; and perform a communication task based on the first machine learning output. Additionally, or alternatively, the communication manager 140 may perform one or more other operations described herein.

In some aspects, the network node 110 may include a communication manager 150. As described in more detail elsewhere herein, the communication manager 150 may receive, from a UE, UE capability information associated with at least one machine learning component; transmit, to the UE, configuration information associated with at the least one machine learning component, wherein the configuration information indicates at least one machine learning operating parameter state that is configured to be changed based on a UE indication; receive, from the UE, a UE indication associated with the at least one machine learning operating parameter state; and perform at least one machine learning operation based on receiving the UE indication. Additionally, or alternatively, the communication manager 150 may perform one or more other operations described herein.

As indicated above, FIG. 1 is provided as an example. Other examples may differ from what is described with regard to FIG. 1.

Figure 2:
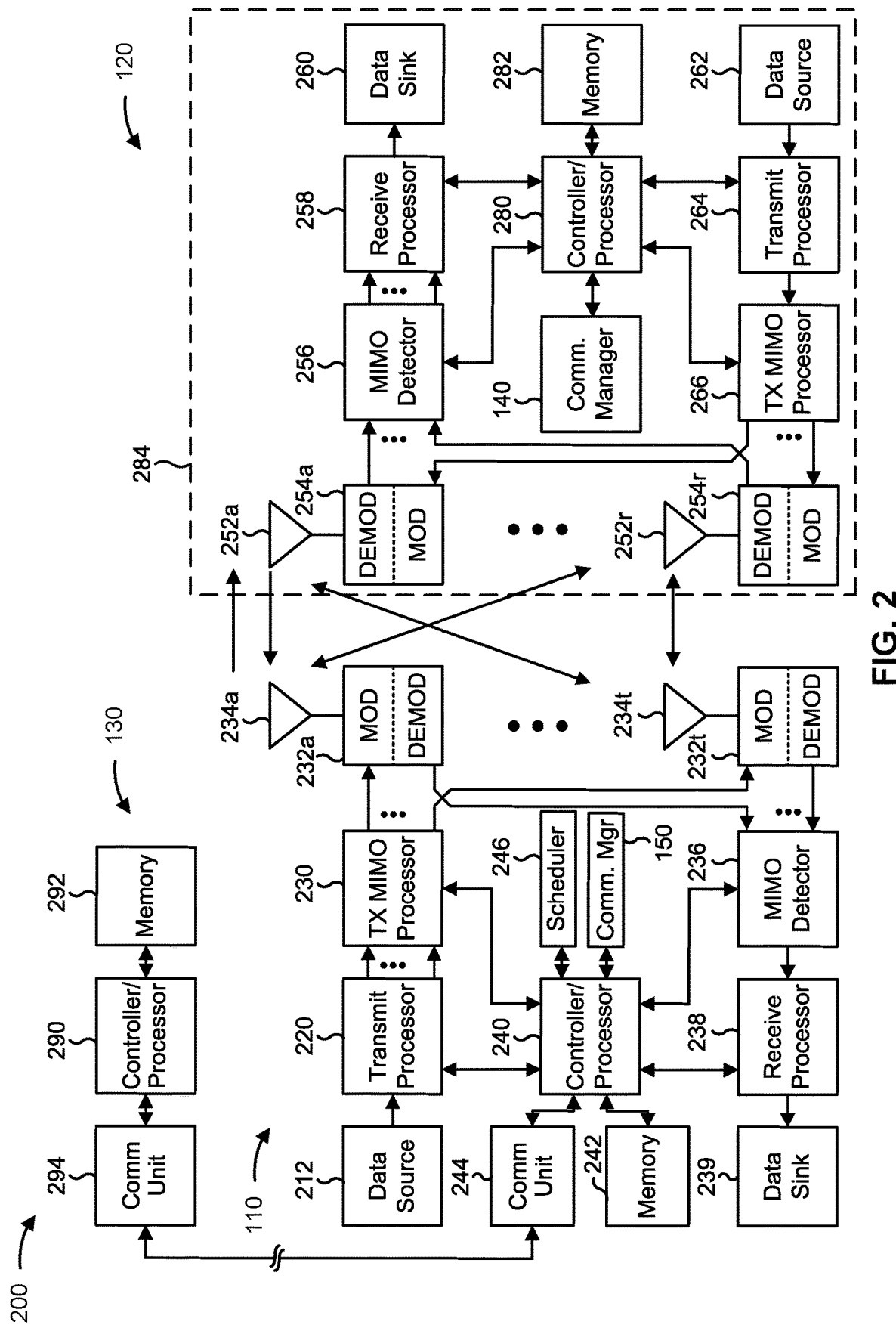
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the network node 110, the controller/processor 280 of the UE 120, and/or any other component(s) of FIG. 2 may perform one or more techniques associated with machine learning component management, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for transmitting, to a network node, UE capability information associated with at least one machine learning component; means for receiving, from the network node and based on the UE capability information, configuration information corresponding to the at least one machine learning component; means for generating a first machine learning output based on the machine learning component; and/or means for performing a communication task based on the first machine learning output. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE, UE capability information associated with at least one machine learning component; means for transmitting, to the UE, configuration information associated with the at least one machine learning component, wherein the configuration information indicates at least one machine learning operating parameter state that is configured to be changed based on a UE indication; means for receiving, from the UE, a UE indication associated with the at least one machine learning operating parameter state; and/or means for performing at least one machine learning operation based on receiving the UE indication. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
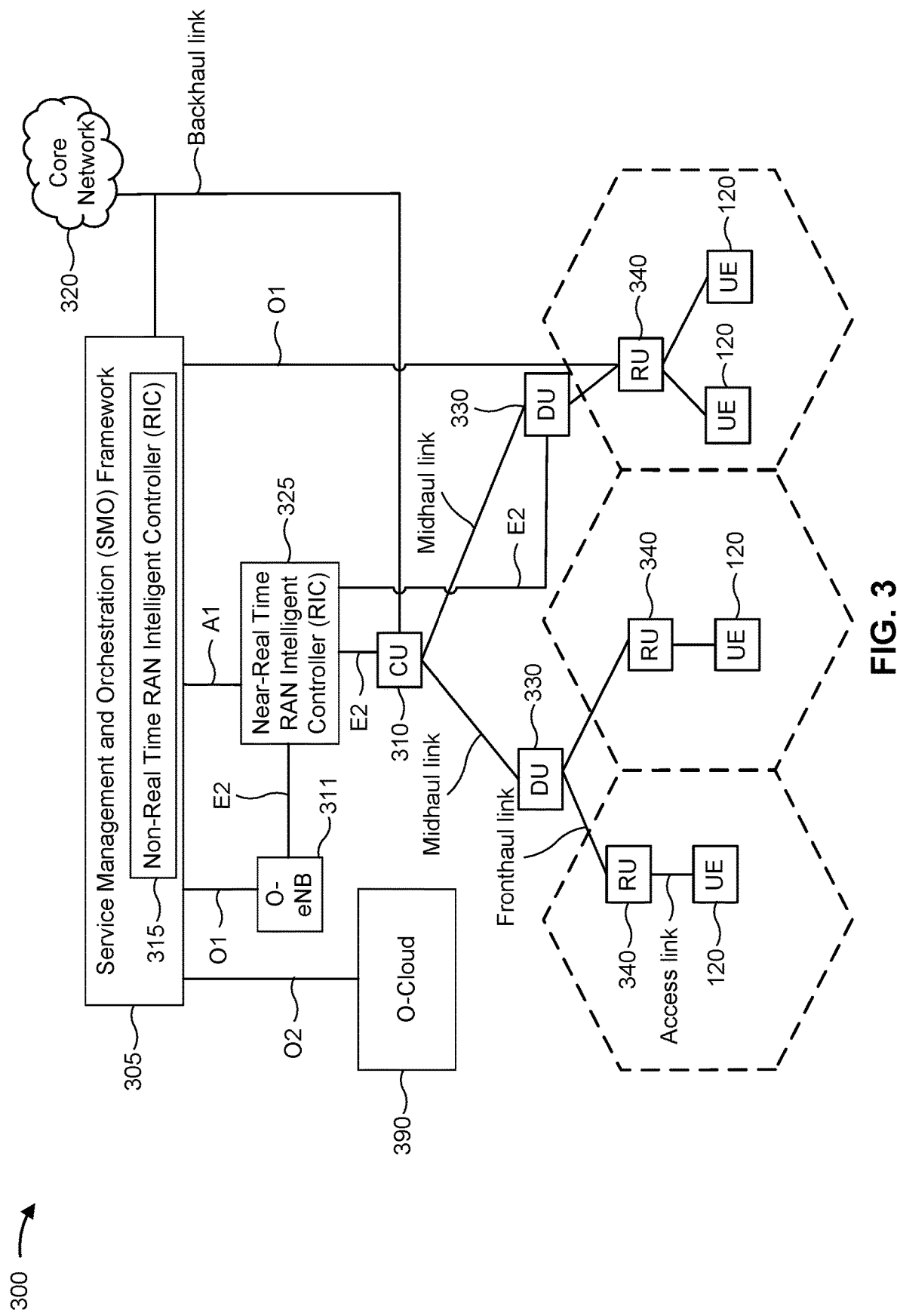
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT MC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Machine learning components are being used more and more to perform a variety of different types of operations. A machine learning component is a software component of a device (e.g., a client device, a server device, a UE, and/or a network node, among other examples) that performs one or more machine learning operations and/or that works with one or more other software and/or hardware components to perform one or more machine learning operations. In some examples, a machine learning component may include, for example, software that may learn to perform an operation without being explicitly trained to perform the operation. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples.

In some examples, machine learning components may be distributed in a network. For example, a server device (e.g., implemented on, or as, a network node) may provide a machine learning component to one or more client devices (e.g., implemented on, or as, a UE). In some aspects, different levels of collaboration between a network node and a UE may be implemented. In a first level there may be no collaborations between the network node and the UE. For example, activation, deactivation, switching, and/or fallback decisions can be made by the UE for a machine learning component instantiated at the UE and by the network node for a machine learning component instantiated at the network node.

In a second level of collaboration, signaling-based collaborations may be implemented. In a third level of collaboration, a machine learning model transfer operation may be supported. For example, a machine learning model may include a model used by a machine learning component to generate a machine learning output. In some cases, the network node can transmit an indication of the machine learning model to the UE and/or vice versa. To implement the second and third levels of collaboration between a network node and a UE, one or more scenarios may be considered.

For example, in a first scenario (scenario 1), the network node may have no information about the machine learning model running at the UE apart from a machine learning function or feature name (MLFN). In a second scenario (scenario 2), the network node may have information, per MLFN, associated with machine learning model identifiers (IDs) and usage conditions of the machine learning models. However, the network node may have no information about the actual machine learning model structure (MS) or an associated parameter set (PS). A machine learning model may use parameters of an associated PS to perform a machine learning operation such as, for example, to predict a future value and/or classify an observed value. In a third scenario (scenario 3), the network node may have information about machine learning MSs and the information may be associated with MS IDs. For example, the network node may have the MS and/or associated PSs for the MS.

During runtime operations, however, a UE and/or a network node can make changes to a machine learning component (e.g., changes to the machine learning model, the MS, and/or associated PSs). For example, a machine learning component may have a number of configurable attributes such as, for example, MLFNs, model IDs (which may be determined based on an MS and a PS), MSs, and/or PSs. For example, in scenario 1, the network does not configure any model information beyond the use of machine learning for a defined feature or wireless communication operation, and thus, there may be no ability for the network to manage individual machine learning models at a UE. In scenario 2, the network can configure a model ID describing the {MS, PS} for a feature. For examples, the network can configure a specific model instance (MS+PS) for the feature, but the network cannot configure the PS. In some cases, the model ID can include the MS and PS and can be represented by a string encoded as a flat namespace (e.g., Model ID=single value to represent {MS, PS} tuples) or a hierarchical namespace (e.g., Model ID={MS, PS} tuple). In scenario 3, the network can configure the MS ID and PS for a feature (e.g., the network can configure the PS for an MS ID).

During development of the machine learning model and/or MS, for example, a UE vendor may develop one or more MSs and PSs (e.g., a channel state feedback encoder) for different UE and/or network node configurations. In scenario 1, the network node may be aware of one or more supported MLFNs, and a machine learning configuration may include parameters for one or more network layers (e.g., physical layer configurations, measurement configuration, medium access layer configuration, and others). When a UE uses the machine learning based operation for a feature, the UE uses a configuration provided by the network for different layers. In scenario 2, the network node may be aware of a supported MLFN, one or more model IDs for each supported MLFN, and usage conditions associated with each model ID, and the machine learning configuration may include model IDs associated with MLFNs and/or usage conditions of the machine learning model. In scenario 3, the network node may be aware of one or more supported MLFNs, one or more MS IDs associated with each MLFN, one or more PSs associated with each MS ID, and usage conditions of each MS and PS ID.

A UE may choose to develop a single model, MS, or PS for more than one network and UE configurations, settings, and environment. In such cases, the UE may not necessarily need an indication from the network every time there is change in network configuration or settings. Rather, the UE can to be modified only when UE has different models for different network configuration. For example, the UE may develop model X for network configurations/settings A/B/C and develop another model for network configuration/settings D/E/F/G. The UE may not necessarily need notification when network configuration/settings changes from A to B/C, while UE may be configured to receive an indication from network for change in network configuration/settings from A to D/E/F/G. Yet in another scenario, UE may not need a notification when network configuration/settings changes from D to E/F/G, while the UE may be configured to receive an indication from the network for a change in network configuration/settings from D to A/B/C. Similarly, in some examples, the UE may be configured to receive an indication from the network to change MS or PS at the UE upon a change in network configuration/settings.

In each scenario, particularly for scenario 1, the network node can signal a change in network settings but can be unaware of which settings and/or configurations for which changes a UE should be notified. Without techniques for managing such change notifications, a machine learning component at a UE that is correlated with a machine learning component at the network node, or vice versa, may produce outputs that do not correlate to outputs of the correlated machine learning component and, as a result, may lead to machine-learning-based wireless communication operations that are inefficient or inaccurate, thereby negatively impacting network performance. In another case, signaling for every change in configuration/settings/environments may induce significant signaling overhead. Therefore, efficient management techniques may be desired to support loading the appropriate models, MSs, or PSs at the UE and network while reducing the signaling overhead.

Some aspects of the techniques and apparatuses described herein provide for machine learning component management. For example, some aspects include techniques for managing, in different collaboration scenarios, changes to machine learning models, changes to MSs, activation and/or deactivation of PSs and/or machine learning components, switching between MSs and/or PSs, and/or fallback operation, among other examples. In some aspects, for example, the UE may transmit UE capability information and/or UE assistance information to the network node that indicates at least one machine learning operating parameter state that is configured to be changed based on a network indication. In some aspects, the network node may transmit, and a UE may receive, a change indication that indicates a change associated with a plurality of machine learning operating parameters. Similarly, a UE may transmit, and the network node may receive, a UE indication that indicates a change associated with a machine learning operating parameter. In this way, a UE and a network node may manage correlated machine learning components so that the outputs of the machine learning components are correlated and useable. Thus, some aspects may facilitate more efficient and/or effective wireless communication tasks, thereby positively impacting network performance.

Figure 4:
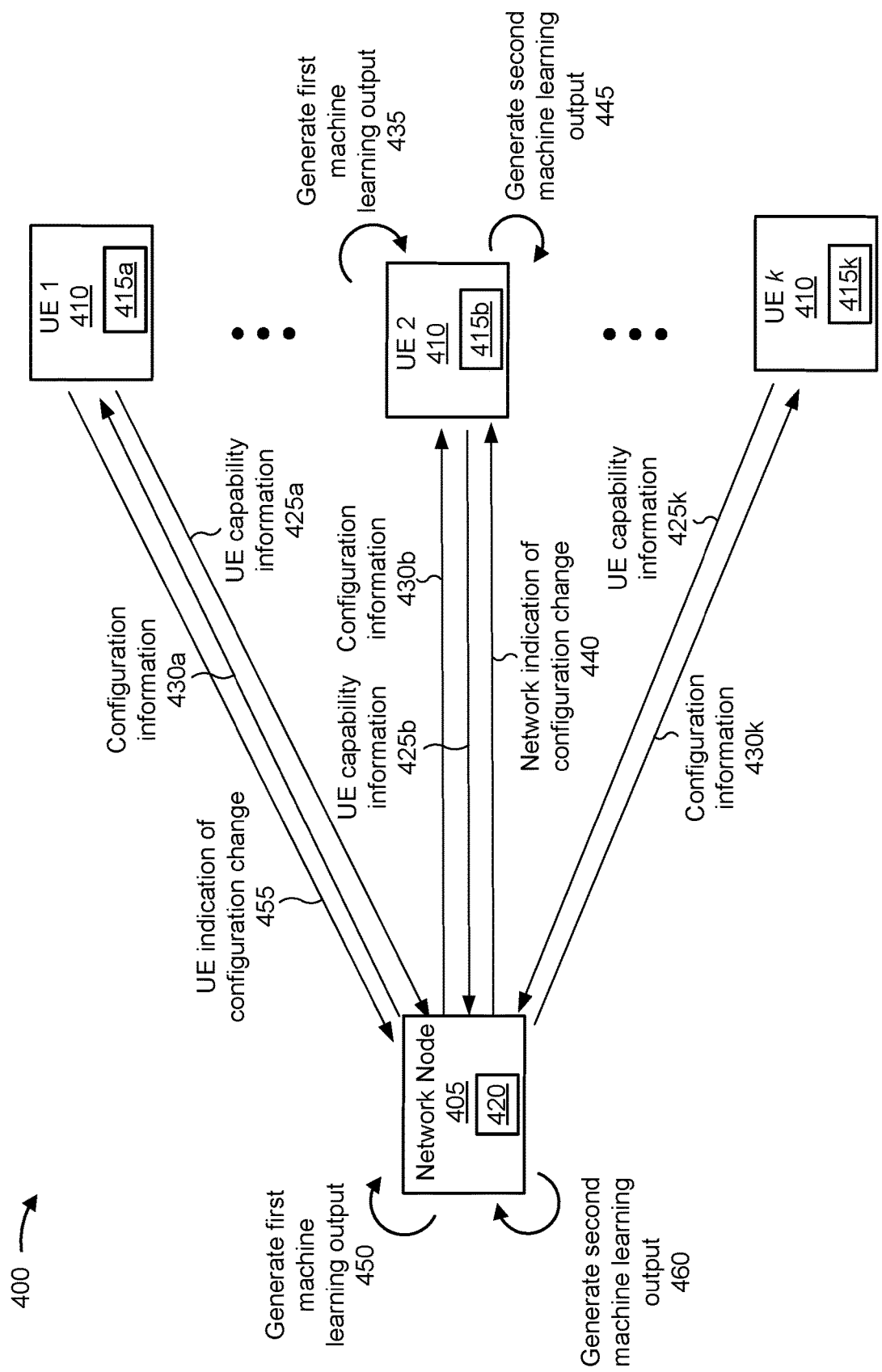
FIG. 4 is a diagram illustrating an example associated with machine learning component management, in accordance with various aspects of the present disclosure.

FIG. 4 is a diagram illustrating an example 400 associated with machine learning component management, in accordance with various aspects of the present disclosure. In example 400, a network node 405 may communicate with one or more UEs 410 (shown as "UE 1," . . . "UE 2," . . . "UE k"). In some aspects, the network node 405 may be, be similar to, include, or be included in, the network node 110 depicted in FIGS. 1 and 2 and/or one or more components of the disaggregated base station architecture depicted in FIG. 3. In some aspects, the UEs 410 may be, be similar to, include, or be included in, the UE 120 depicted in FIGS. 1-3.

The network node 405 and the UEs 410 may communicate with one another via a wireless network (e.g., the wireless network 100 shown in FIG. 1). In some aspects, any number of additional UEs 410 may be included in the set of K UEs 410. In some aspects, one or more UEs 410 may communicate with one or more other UEs 410 via a sidelink connection. As shown, each UE 410 may have instantiated thereon a machine learning component 415a, 415b, 415k, respectively. In some aspects, each machine learning component 415a, 415b, 415k may have the same or different attributes such as MLFNs, machine learning models, MSs, PSs, and/or MS IDs, among other examples. A machine learning component 420 may be instantiated at the network node 405. The machine learning component 420 may be correlated with any one or more of the machine learning components 415a, 415b, 415k.

As shown by reference number 425a, the UE 1 410 may transmit, and the network node 405 may receive, UE capability information. The UE capability information may be associated with the machine learning component 415a. Similarly, as shown by reference number 425b, the UE 2 410 may transmit, and the network node 405 may receive, UE capability information associated with the machine learning component 415b, and as shown by reference number 425k, the UE k 410 may transmit, and the network node 405 may receive, UE capability information associated with the machine learning component 415k.

As shown by reference number 430a, the network node 405 may transmit, and the UE 1 410 may receive, configuration information. The configuration information may correspond to the machine learning component 415a. Similarly, as shown by reference number 430b, the network node 405 may transmit, and the UE 2 410 may receive, configuration information corresponding to the machine learning component 415b, and as shown by reference number 430k, the network node 405 may transmit, and the UE 3 410 may receive, configuration information corresponding to the machine learning component 415k. The configuration information may at least partially provide a configuration of a machine learning component 415a, 415b, 415k. In some aspects, a UE 410 may develop one or more aspects of a configuration of a machine learning component (e.g., via a machine learning training operation). In some aspects, the configuration information may be based on the respective UE capability information.

As shown by reference number 435, the UE 2 410 may generate a first machine learning output. For example, the UE 2 410 may generate the first machine learning output using the machine learning component 415b and based on the configuration information associated with the machine learning component 415b. Similarly, although not illustrated, one or more of the UEs 1 and k may generate respective first machine learning outputs based on the respective machine learning components 415a and 415k and the corresponding configuration information.

As shown by reference number 440, the network node 405 may transmit, and the UE 2 410 may receive, a network indication of a configuration change. For example, the network indication may indicate a change in a configuration of the machine learning component 420 instantiated at the network node 405 and/or a change in a configuration (or setting) associated with the machine learning component 415b. As shown by reference number 445, the UE 2 410 may generate a second machine learning output. The UE 2 410 may generate the second machine learning output based on the configuration change. Similarly, any one or more of the other UEs 410 may receive indications of configuration changes and may generate respective second machine learning outputs based thereon.

As shown by reference number 450, the network node 405 may generate a first machine learning output using the machine learning component 420. As shown by reference number 455, the UE 1 410 may transmit, and the network node 405 may receive, a UE indication of a configuration change. The UE indication of the configuration change may be associated with the machine learning component 415a and/or the machine learning component 420. Similarly, any number of the other UEs 410 may transmit UE indications of configuration changes. As shown by reference number 460, the network node 405 may generate a second machine learning output based on the configuration change or changes.

As indicated above, FIG. 4 is provided merely as an example. Other examples may differ from what is described with regard to FIG. 4.

Figure 5:
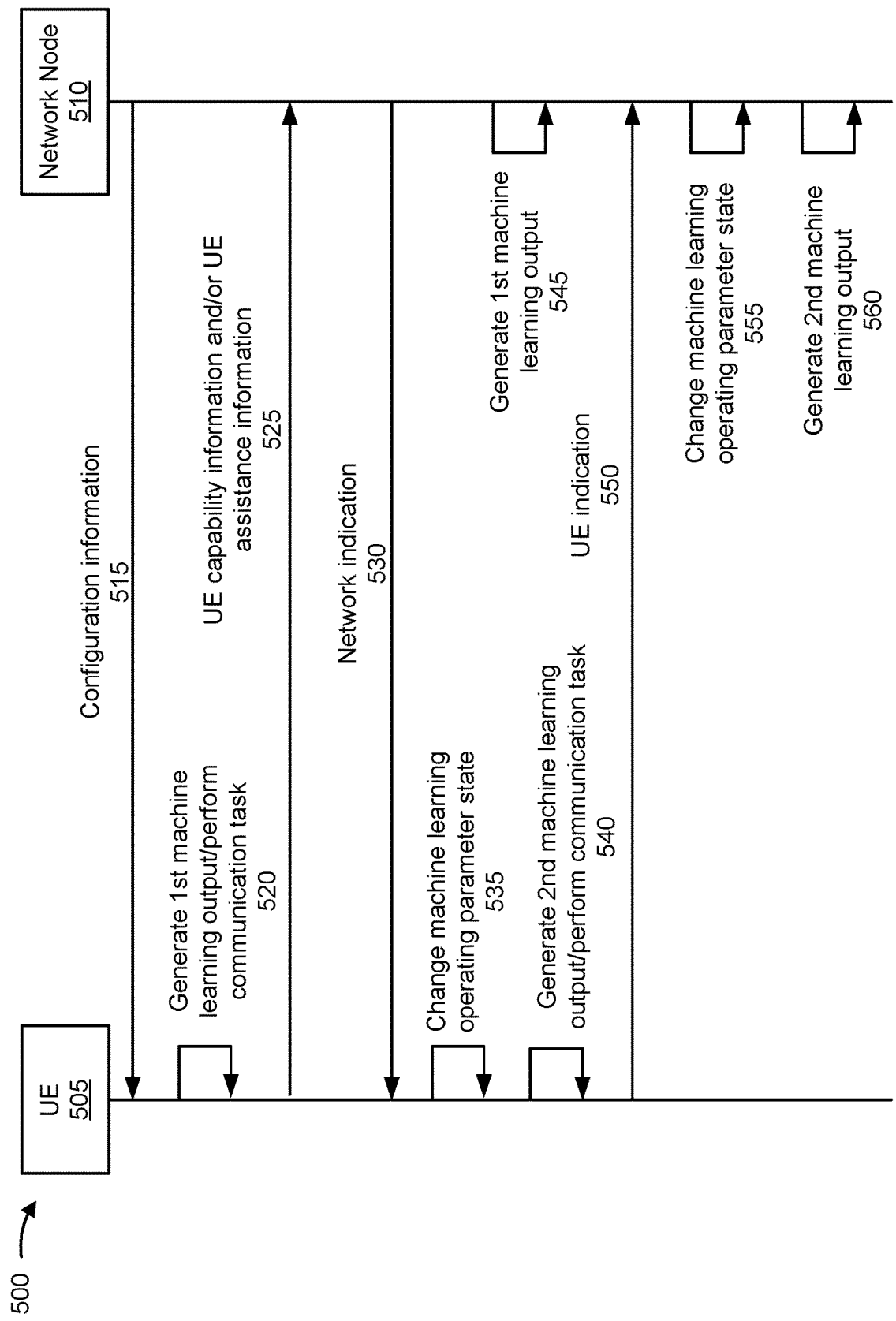
FIG. 5 is a diagram illustrating an example of machine learning component management, in accordance with various aspects of the present disclosure.

FIG. 5 is a diagram illustrating an example 500 of machine learning component management, in accordance with various aspects of the present disclosure. As shown, a UE 505 and a network node 510 may communicate with one another. In some aspects, the UE 505 may be, be similar to, include, or be included in one or more of the UEs 410 shown in FIG. 4. In some aspects, the network node 510 may be, be similar to, include, or be included in the network node 405 shown in FIG. 4.

As shown by reference number 515, the network node 510 may transmit, and the UE 505 may receive, UE capability information. The UE capability information may be associated with at least one machine learning component. As shown by reference number 520, the UE 505 may generate a first machine learning output and perform a communication task based on the first machine learning output. The UE 505 may generate the first machine learning output based on the at least one machine learning component. A machine learning output may include, for example, an output based on an inference operation and/or a training operation.

As shown by reference number 525, the UE 505 may transmit, and the network node 510 may receive, UE capability information and/or UE assistance information. In some aspects, the UE 505 may transmit UE capability information and/or UE assistance information prior to receiving the configuration information in addition to, or in lieu of, transmitting the UE capability information and/or UE assistance information after receiving the configuration information. As shown by reference number 530, the network node 510 may transmit, and the UE 505 may receive, a network indication. The network indication may be a network indication of a configuration change (e.g., a "change indication"). For example, the network change indication may indicate a change associated with a plurality of machine learning operating parameters.

As shown by reference number 535, the UE 505 may change a machine learning operating parameter state. For example, the UE 505 may change the machine learning operation parameter state based on receiving the network indication. As shown by reference number 540, the UE 505 may generate a second machine learning output and perform a communication task based on the second machine learning output. For example, the UE 505 may generate the second machine learning output based on the changed machine learning operating parameter state.

In some aspects, the UE 505 may change at least one machine learning operating parameter associated with the at least one machine learning component. The at least one machine learning operating parameter may include at least one of a network setting or a machine learning configuration. In some aspects, the UE capability information may indicate at least one machine learning operating parameter state that is configured to be changed based on a network indication, and the UE 505 may receive, from the network node 510, a network indication associated with the at least one machine learning operating parameter state. The UE 505 may change the at least one machine learning operating parameter state from a first state to a second state based on receiving the network indication. The at least one machine learning operating parameter state may include at least one of a network setting associated with the machine learning component or a machine learning configuration associated with the machine learning component. The UE capability information may indicate the at least one machine learning operating parameter state based on an indication of at least one MLFN. In some aspects, the UE capability information may indicate one or more machine learning parameter states, of the at least one machine learning operating parameter state, associated with an MLFN.

In some aspects, the UE 505 may transmit, and the network node 510 may receive, UE assistance information that indicates at least one machine learning operating parameter state that is configured to be changed based on a network indication. The UE assistance information may indicate the at least one machine learning operating parameter state based on including a request for a network indication associated with the at least one machine learning operating parameter state. For example, the network node 510 may transmit, and the UE 505 may receive, a network indication associated with the at least one machine learning operating parameter state. The UE 505 may change the at least one machine learning operating parameter state from a first state to a second state based on receiving the network indication.

In some aspects, the at least one machine learning component may include a first machine learning component instantiated at the UE 505 and a second machine learning component instantiated at the network node 510. The second machine learning component may be correlated with the first machine learning component. A first set of model structures and a first set of parameter sets may correspond to the first machine learning component, and a second set of model structures and a second set of parameter sets may correspond to the second machine learning component. In some aspects, a first machine learning configuration may correspond to the first machine learning component and a second machine learning configuration may correspond to the second machine learning configuration. A first set of priorities may correspond to the first machine learning configuration and a second set of priorities may correspond to the second machine learning configuration. In some aspects, the UE capability information may indicate at least one of cooperation support associated with the second machine learning configuration or that the network indication is to be transmitted based on the configuration change associated with the second machine learning configuration.

In some aspects, the network node 510 may transmit, and the UE 505 may receive, a network indication that indicates an activation operation associated with the at least one machine learning component, a deactivation operation associated with the at least one machine learning component, or a switch operation associated with the at least one machine learning component. The switch operation may correspond to at least one of a switch from a first model structure to a second model structure or a switch from a first parameter set to a second parameter set. In some aspects, the UE 505 may determine to change at least one machine learning operating parameter state associated with at least one machine learning component from a first state to a second state and may transmit, to the network node 510, a UE indication associated with changing the at least one machine learning operating parameter state from the first state to the second state. The determination to change the at least one machine learning operating parameter state may be based on satisfaction of at least one of a network-configured change condition, a UE change condition, or a UE key performance indicator condition. The UE indication may include a request for the network indication. In some aspects, the UE indication and/or the network indication may be transmitted using uplink medium access control control elements (UL MAC CEs) and/or radio resource control (RRC) messages.

As shown by reference number 545, the network node 510 may generate a first machine learning output based on the second machine learning component. In some aspects, the network node 510 may perform a wireless communication task based on the second machine learning component. As shown by reference number 550, the UE 505 may transmit, and the network node 510 may receive, a UE indication. The UE indication may be a UE indication of a configuration change associated with the first machine learning configuration. The configuration information may include a configuration associated with transmitting the indication. As shown by reference number 555, the network node 510 may change at least one machine operating parameter state based on receiving the UE indication. In some aspects, the UE indication may indicate at least one of a change in the first machine learning configuration, a change associated with an environment corresponding to the first machine learning configuration, or a change associated with an execution of the first machine learning configuration.

In some aspects, the network node 510 may perform the at least one machine learning operation based on providing an indication, to an additional network node, to perform at least one additional machine learning operation. In some aspects, the network node 510 may include a CU and/or a DU and the at least one additional network node may include a DU and/or an RIC, or any other RAN node (e.g., a component of the disaggregated base station architecture 300 depicted in FIG. 3).

For example, the indication to perform the at least one additional machine learning operation may include at least one of an indication to change the at least one machine learning operating parameter state from a first state to a second state based on the indication; an indication to generate a machine learning output based on the machine learning component; or an indication to perform a communication task based on the machine learning output.

As indicated above, FIG. 5 is provided as an example. Other examples may differ from what is described with regard to FIG. 5.

Figure 6:
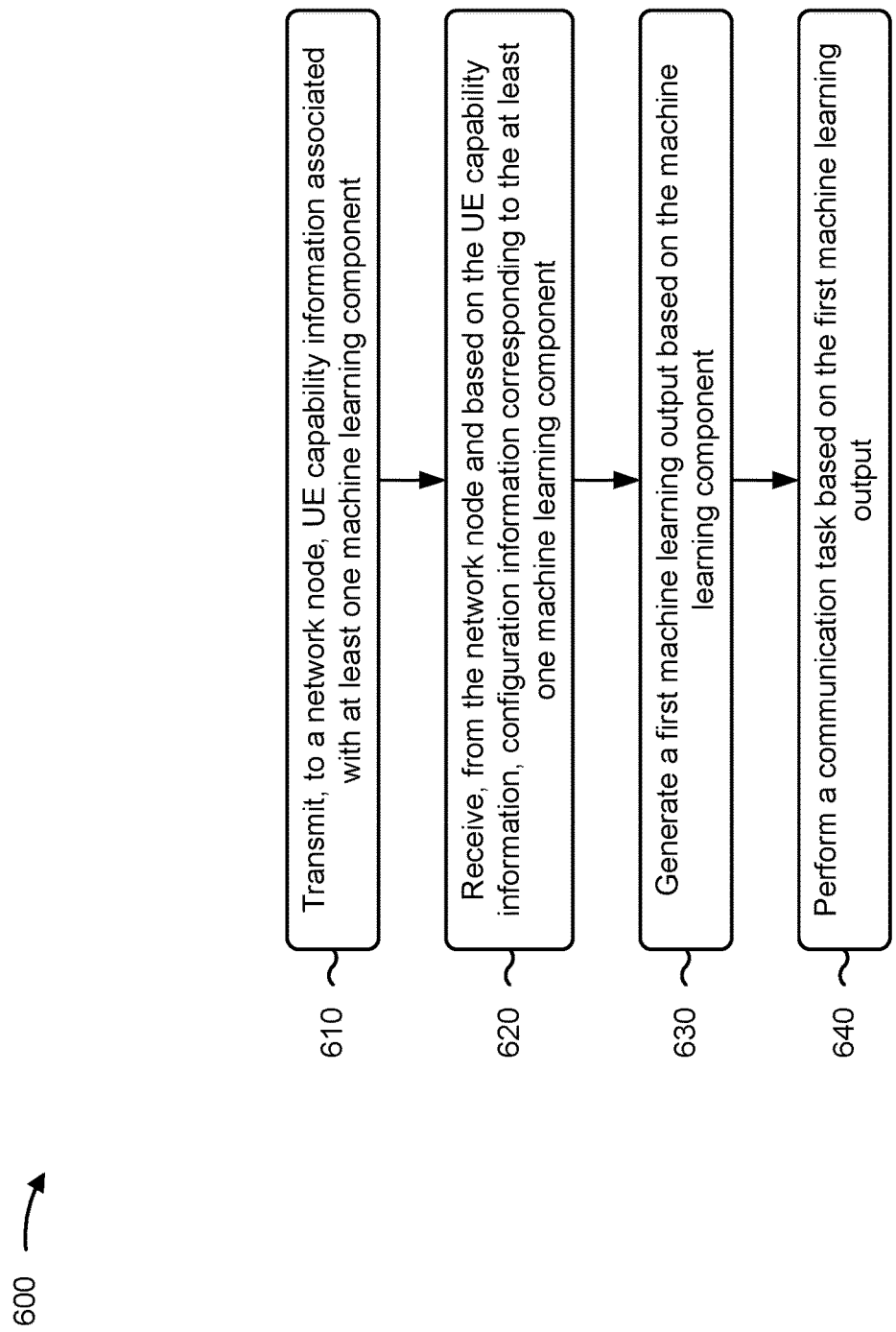
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 410, and/or UE 505) performs operations associated with machine learning component management.

As shown in FIG. 6, in some aspects, process 600 may include transmitting, to a network node, UE capability information associated with at least one machine learning component (block 610). For example, the UE (e.g., using communication manager 808 and/or transmission component 804, depicted in FIG. 8) may transmit, to a network node, UE capability information associated with at least one machine learning component, as described above.

As further shown in FIG. 6, in some aspects, process 600 may include receiving, from the network node and based on the UE capability information, configuration information corresponding to the at least one machine learning component (block 620). For example, the UE (e.g., using communication manager 808 and/or reception component 802, depicted in FIG. 8) may receive, from the network node and based on the UE capability information, configuration information corresponding to the at least one machine learning component, as described above.

As further shown in FIG. 6, in some aspects, process 600 may include generating a first machine learning output based on the machine learning component (block 630). For example, the UE (e.g., using communication manager 808 and/or machine learning component 810, depicted in FIG. 8) may generate a first machine learning output based on the machine learning component, as described above.

As further shown in FIG. 6, in some aspects, process 600 may include performing a communication task based on the first machine learning output (block 640). For example, the UE (e.g., using communication manager 808, reception component 802, and/or transmission component 804, depicted in FIG. 8) may perform a communication task based on the first machine learning output, as described above.

Process 600 may include additional aspects, such as any single aspect or any combination of aspects described below and/or in connection with one or more other processes described elsewhere herein.

In some aspects, process 600 includes changing at least one machine learning operating parameter associated with the at least one machine learning component. In some aspects, the at least one machine learning operating parameter comprises at least one of a network setting or a machine learning configuration. In some aspects, process 600 includes receiving, from the network node, a change indication that indicates a change associated with a plurality of machine learning operating parameters including the at least one machine learning operating parameter.

In some aspects, the UE capability information indicates at least one machine learning operating parameter state that is configured to be changed based on a network indication, and process 600 includes receiving, from the network node, a network indication associated with the at least one machine learning operating parameter state, and changing the at least one machine learning operating parameter state from a first state to a second state based on receiving the network indication. In some aspects, the at least one machine learning operating parameter state comprises at least one of a network setting associated with the machine learning component or a machine learning configuration associated with the machine learning component. In some aspects, the UE capability information indicates the at least one machine learning operating parameter state based on an indication of at least one machine learning feature name. In some aspects, the UE capability information indicates one or more machine learning parameter states, of the at least one machine learning operating parameter state, associated with a machine learning feature name.

In some aspects, process 600 includes transmitting UE assistance information that indicates at least one machine learning operating parameter state that is configured to be changed based on a network indication. In some aspects, the UE assistance information indicates the at least one machine learning operating parameter state based on including a request for a network indication associated with the at least one machine learning operating parameter state, and process 600 includes receiving, from the network node, a network indication associated with the at least one machine learning operating parameter state, and changing the at least one machine learning operating parameter state from a first state to a second state based on receiving the network indication.

In some aspects, the at least one machine learning component comprises a first machine learning component instantiated at the UE and a second machine learning component instantiated at the network node, wherein the second machine learning component is correlated with the first machine learning component. In some aspects, a first set of model structures and a first set of parameter sets correspond to the first machine learning component, and a second set of model structures and a second set of parameter sets correspond to the second machine learning component. In some aspects, a first machine learning configuration corresponds to the first machine learning component, wherein a second machine learning configuration corresponds to the second machine learning configuration, wherein a first set of priorities corresponds to the first machine learning configuration, and wherein a second set of priorities corresponds to the second machine learning configuration.

In some aspects, process 600 includes transmitting, to the network node, a UE indication of a configuration change associated with the first machine learning configuration. In some aspects, the configuration information comprises a configuration associated with transmitting the indication. In some aspects, the UE indication indicates at least one of a change in the first machine learning configuration, a change associated with an environment corresponding to the first machine learning configuration, or a change associated with an execution of the first machine learning configuration. In some aspects, process 600 includes receiving, from the network node, a network indication of a configuration change associated with the second machine learning configuration. In some aspects, the UE capability information indicates at least one of cooperation support associated with the second machine learning configuration or that the network indication is to be transmitted based on the configuration change associated with the second machine learning configuration. In some aspects, process 600 includes changing the first machine learning configuration based on receiving the indication of the configuration change associated with the second machine learning configuration.

In some aspects, process 600 includes receiving, from the network node, a network indication that indicates an activation operation associated with the at least one machine learning component, a deactivation operation associated with the at least one machine learning component, or a switch operation associated with the at least one machine learning component, wherein generating at least one of the first machine learning output or a second machine learning output comprises generating an output based at least in part on receiving the network indication. In some aspects, the switch operation corresponds to at least one of a switch from a first model structure to a second model structure or a switch from a first parameter set to a second parameter set.

In some aspects, process 600 includes determining to change at least one machine learning operating parameter state associated with at least one machine learning component from a first state to a second state, and transmitting, to the network node, a UE indication associated with changing the at least one machine learning operating parameter state from the first state to the second state. In some aspects, the determination to change the at least one machine learning operating parameter state is based on satisfaction of at least one of a network-configured change condition, a UE change condition, or a UE key performance indicator condition.

In some aspects, the UE indication comprises a request for the network indication. In some aspects, transmitting the UE indication comprises transmitting a MAC CE that includes the UE indication. In some aspects, transmitting the UE indication comprises transmitting an RRC message that includes the UE indication. In some aspects, receiving the network indication comprises receiving the network indication from a DU. In some aspects, receiving the network indication comprises receiving a MAC CE that includes the network indication. In some aspects, receiving the network indication comprises receiving an RRC message that includes the network indication.

In some aspects, the first machine learning output is based on an inference operation. In some aspects, the first machine learning output is based on a training operation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
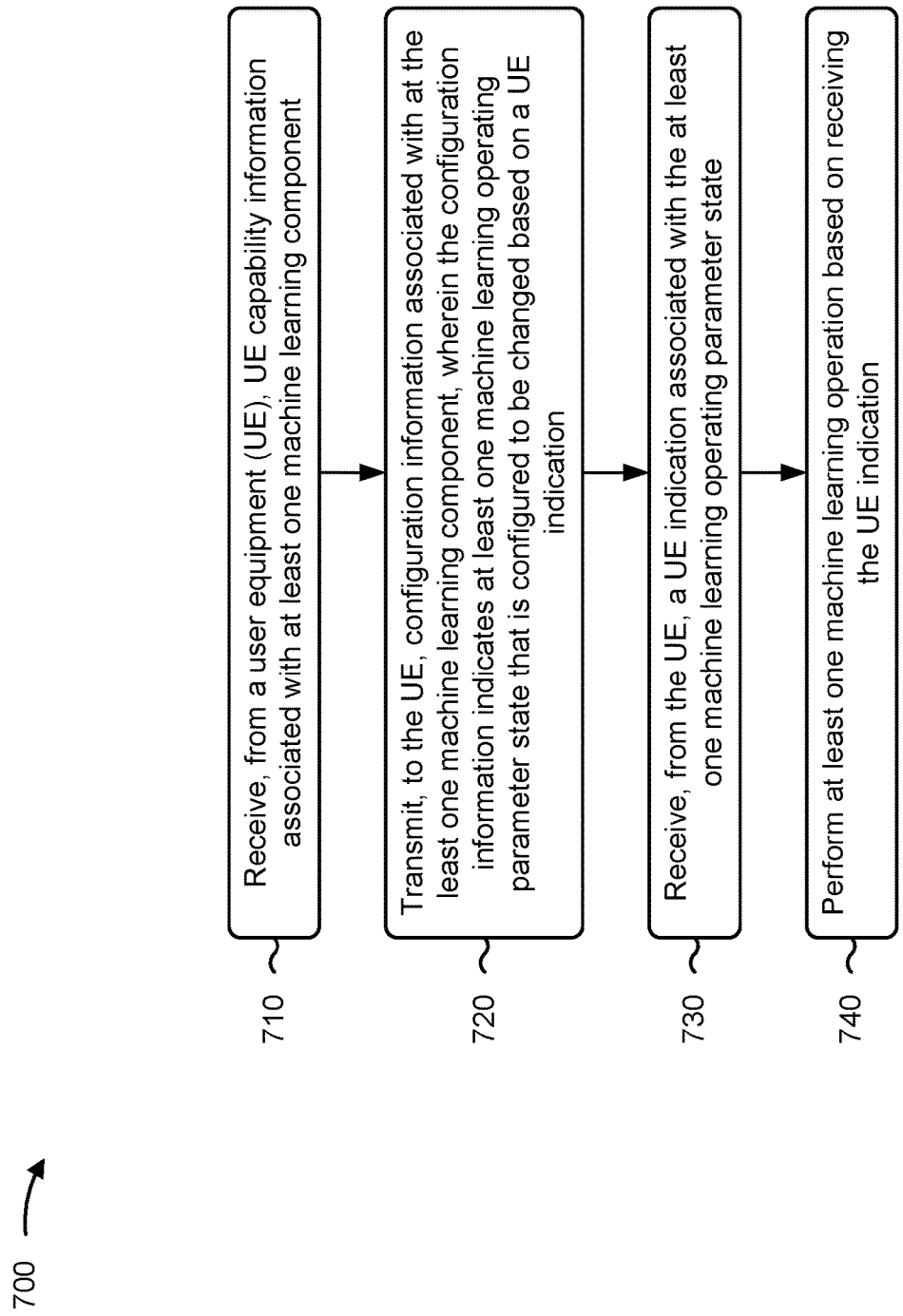
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 405 and/or network node 510) performs operations associated with machine learning component management.

As shown in FIG. 7, in some aspects, process 700 may include receiving, from a UE, UE capability information associated with at least one machine learning component (block 710). For example, the network node (e.g., using communication manager 908 and/or reception component 902, depicted in FIG. 9) may receive, from a UE, UE capability information associated with at least one machine learning component, as described above.

As further shown in FIG. 7, in some aspects, process 700 may include transmitting, to the UE, configuration information associated with at the least one machine learning component, wherein the configuration information indicates at least one machine learning operating parameter state that is configured to be changed based on a UE indication (block 720). For example, the network node (e.g., using communication manager 908 and/or transmission component 904, depicted in FIG. 9) may transmit, to the UE, configuration information associated with at the least one machine learning component, wherein the configuration information indicates at least one machine learning operating parameter state that is configured to be changed based on a UE indication, as described above.

As further shown in FIG. 7, in some aspects, process 700 may include receiving, from the UE, a UE indication associated with the at least one machine learning operating parameter state (block 730). For example, the network node (e.g., using communication manager 908 and/or reception component 902, depicted in FIG. 9) may receive, from the UE, a UE indication associated with the at least one machine learning operating parameter state, as described above.

As further shown in FIG. 7, in some aspects, process 700 may include performing at least one machine learning operation based on receiving the UE indication (block 740). For example, the network node (e.g., using communication manager 908, reception component 902, and/or transmission component 904, depicted in FIG. 9) may perform at least one machine learning operation based on receiving the UE indication, as described above.

Process 700 may include additional aspects, such as any single aspect or any combination of aspects described below and/or in connection with one or more other processes described elsewhere herein.

In some aspects, performing the at least one machine learning operation comprises at least one of changing the at least one machine learning operating parameter state from a first state to a second state based on receiving the UE indication, generating a machine learning output based on the machine learning component, or performing a communication task based on the machine learning output. In some aspects, performing the at least one machine learning operation comprises providing an indication, to an additional network node, to perform at least one additional machine learning operation. In some aspects, the indication to perform the at least one additional machine learning operation comprises at least one of an indication to change the at least one machine learning operating parameter state from a first state to a second state based, an indication to generate a machine learning output based on the machine learning component, or an indication to perform a communication task based on the machine learning output.

In some aspects, the at least one machine learning component comprises a first machine learning component instantiated at the UE and a second machine learning component instantiated at the network node, wherein the second machine learning component is correlated with the first machine learning component. In some aspects, a first set of model structures and a first set of parameter sets correspond to the first machine learning component, and a second set of model structures and a second set of parameter sets correspond to the second machine learning component. In some aspects, a first machine learning configuration corresponds to the first machine learning component, wherein a second machine learning configuration corresponds to the second machine learning configuration, wherein a first set of priorities corresponds to the first machine learning configuration, and wherein a second set of priorities corresponds to the second machine learning configuration. In some aspects, the at least one machine learning operating parameter state comprises a configuration change associated with the second machine learning configuration. In some aspects, the configuration information comprises a configuration associated with transmitting the indication.

In some aspects, the UE indication indicates at least one of a change in the first machine learning configuration, a change associated with an environment corresponding to the first machine learning configuration, or a change associated with an execution of the first machine learning configuration. In some aspects, changing the at least one machine learning operating parameter state from a first state to a second state includes changing the second machine learning configuration based on receiving the UE indication of the configuration change associated with first second machine learning configuration. In some aspects, process 700 includes transmitting, to the UE, a network indication of a configuration change associated with the second machine learning configuration. In some aspects, the UE capability information indicates at least one of cooperation support associated with the second machine learning configuration or that the network indication is to be transmitted based on the configuration change associated with the second machine learning configuration.

In some aspects, the network indication that indicates an activation operation associated with the first machine learning configuration, a deactivation operation associated with the first machine learning configuration, or a switch operation associated with the first machine learning configuration. In some aspects, the switch operation corresponds to at least one of a switch from a first model structure to a second model structure or a switch from a first parameter set to a second parameter set. In some aspects, process 700 includes receiving, from the UE, a UE indication associated with changing the first machine learning configuration from a first state to a second state.

In some aspects, the UE indication comprises a request for the network indication. In some aspects, receiving the UE indication comprises receiving a MAC CE that includes the UE indication. In some aspects, receiving the UE indication comprises receiving an RRC message that includes the UE indication. In some aspects, transmitting the network indication comprises transmitting the network indication using a DU. In some aspects, transmitting the network indication comprises transmitting a MAC CE that includes the network indication. In some aspects, transmitting the network indication comprises transmitting an RRC message that includes the network indication.

In some aspects, performing the at least one machine learning operation comprises performing an inference operation. In some aspects, performing the at least one machine learning operation comprises performing a training operation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
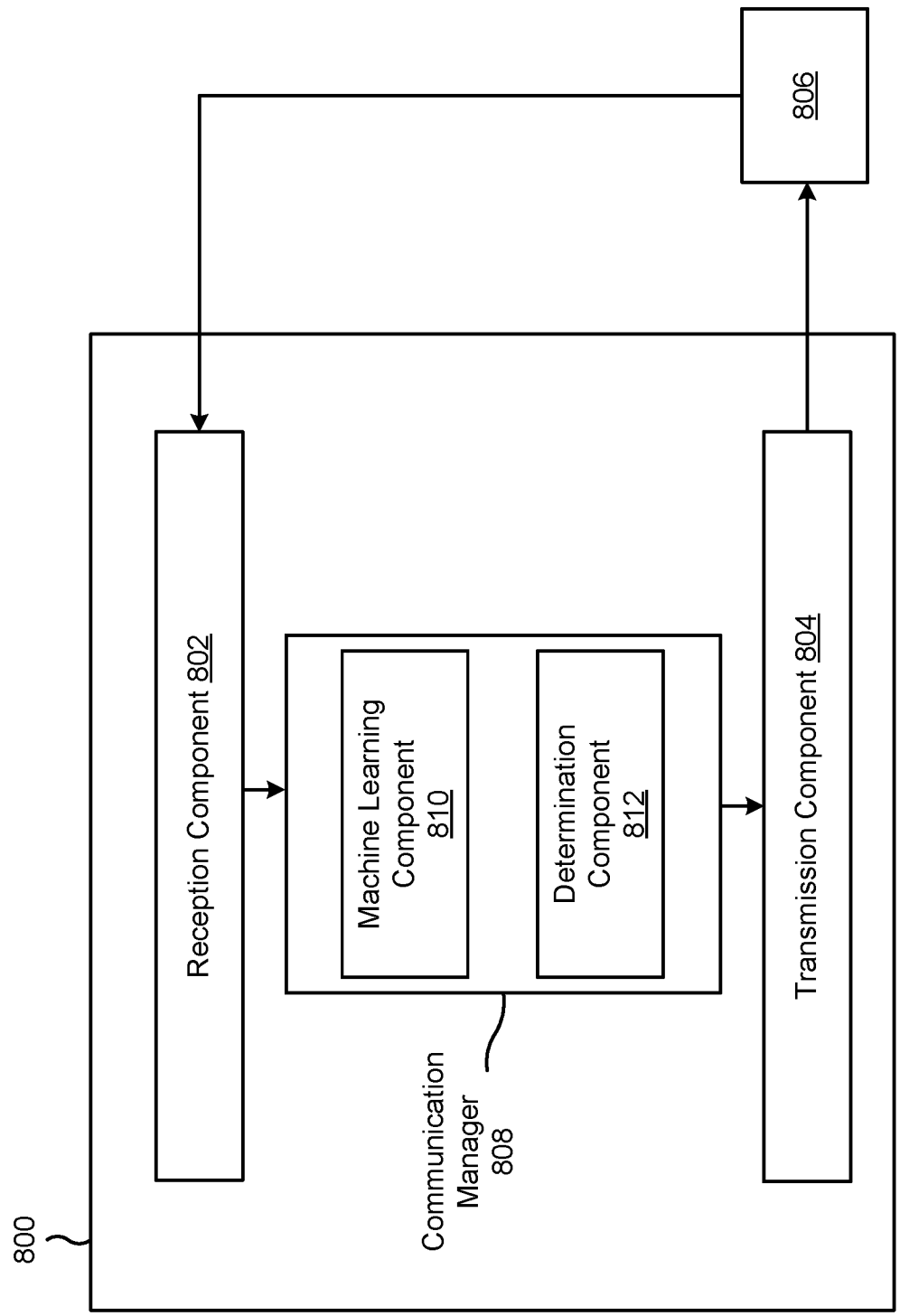
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. The communication manager 808 may include one or more of a machine learning component 810, or a determination component 812, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 808 and/or the transmission component 804 may transmit, to a network node, UE capability information associated with at least one machine learning component. In some aspects, the communication manager 808 may include one or more antennas, a modem, a controller/processor, a memory, or a combination thereof, of the UE described in connection with FIG. 2. In some aspects, the communication manager 808 may include the reception component 802 and/or the transmission component 804. In some aspects, the communication manager 808 may be, be similar to, include, or be included in, the communication manager 140 depicted in FIGS. 1 and 2. The communication manager 808 and/or the reception component 802 may receive, from the network node and based on the UE capability information, configuration information corresponding to the at least one machine learning component.

The communication manager 808 and/or the machine learning component 810 may generate a first machine learning output based on the machine learning component. In some aspects, the machine learning component 810 may include one or more antennas, a modem, a controller/processor, a memory, or a combination thereof, of the UE described in connection with FIG. 2. In some aspects, the machine learning component 810 may include the reception component 802 and/or the transmission component 804. In some aspects, the machine learning component 810 may be, be similar to, include, or be included in, the machine learning component 420 depicted in FIG. 4. The communication manager 808, the reception component 802, and/or the transmission component 804 may perform a communication task based on the first machine learning output. The communication manager 808 and/or the machine learning component 810 may change at least one machine learning operating parameter associated with the at least one machine learning component.

The communication manager 808 and/or the reception component 802 may receive, from the network node, a change indication that indicates a change associated with a plurality of machine learning operating parameters including the at least one machine learning operating parameter. The communication manager 808 and/or the transmission component 804 may transmit UE assistance information that indicates at least one machine learning operating parameter state that is configured to be changed based on a network indication. The communication manager 808 and/or the transmission component 804 may transmit, to the network node, a UE indication of a configuration change associated with the first machine learning configuration. The communication manager 808 and/or the reception component 802 may receive, from the network node, a network indication of a configuration change associated with the second machine learning configuration. The communication manager 808 and/or the machine learning component 810 may change the first machine learning configuration based on receiving the indication of the configuration change associated with the second machine learning configuration.

The communication manager 808 and/or the reception component 802 may receive, from the network node, a network indication that indicates an activation operation associated with the at least one machine learning component, a deactivation operation associated with the at least one machine learning component, or a switch operation associated with the at least one machine learning component, wherein generating at least one of the first machine learning output or a second machine learning output comprises generating an output based at least in part on receiving the network indication. The communication manager 808 and/or the determination component 812 may determine to change at least one machine learning operating parameter state associated with at least one machine learning component from a first state to a second state. The determination component 812 may generate a first machine learning output based on the machine learning component. In some aspects, the determination component 812 may include one or more antennas, a modem, a controller/processor, a memory, or a combination thereof, of the UE described in connection with FIG. 2. In some aspects, the determination component 812 may include the reception component 802 and/or the transmission component 804. The communication manager 808 and/or the transmission component 804 may transmit, to the network node, a UE indication associated with changing the at least one machine learning operating parameter state from the first state to the second state.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
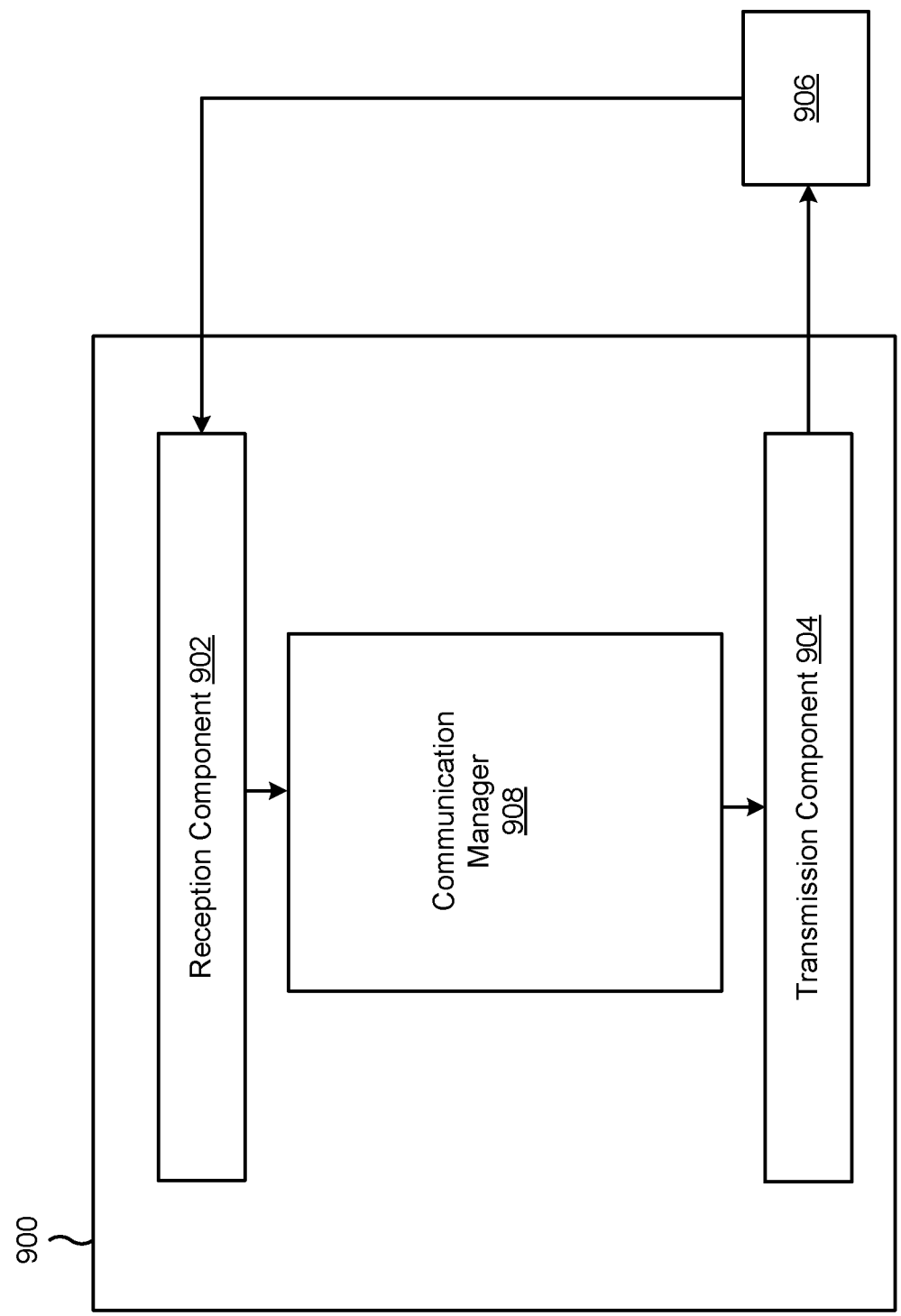
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 908 and/or the reception component 902 may receive, from a UE, UE capability information associated with at least one machine learning component. In some aspects, the communication manager 908 may include one or more antennas, a modem, a controller/processor, a memory, or a combination thereof, of the network node described in connection with FIG. 2. In some aspects, the communication manager 908 may include the reception component 902 and/or the transmission component 904. In some aspects, the communication manager 908 may be, be similar to, include, or be included in, the communication manager 150 depicted in FIGS. 1 and 2.

The communication manager 908 and/or the transmission component 904 may transmit, to the UE, configuration information associated with at the least one machine learning component, wherein the configuration information indicates at least one machine learning operating parameter state that is configured to be changed based on a UE indication. The communication manager 908 and/or the reception component 902 may receive, from the UE, a UE indication associated with the at least one machine learning operating parameter state. The communication manager 908, the reception component 902, and/or the transmission component 904 may perform at least one machine learning operation based on receiving the UE indication.

The communication manager 908 and/or the transmission component 904 may transmit, to the UE, a network indication of a configuration change associated with the second machine learning configuration. The communication manager 908 and/or the reception component 902 may receive, from the UE, a UE indication associated with changing the first machine learning configuration from a first state to a second state.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network node, UE capability information associated with at least one machine learning component; receiving, from the network node and based on the UE capability information, configuration information corresponding to the at least one machine learning component; generating a first machine learning output based on the machine learning component; and performing a communication task based on the first machine learning output.

Aspect 2: The method of Aspect 1, further comprising changing at least one machine learning operating parameter associated with the at least one machine learning component.

Aspect 3: The method of Aspect 2, wherein the at least one machine learning operating parameter comprises at least one of a network setting or a machine learning configuration.

Aspect 4: The method of either of Aspects 2 or 3, further comprising receiving, from the network node, a change indication that indicates a change associated with a plurality of machine learning operating parameters including the at least one machine learning operating parameter.

Aspect 5: The method of any of Aspects 1-4, wherein the UE capability information indicates at least one machine learning operating parameter state that is configured to be changed based on a network indication, the method further comprising: receiving, from the network node, a network indication associated with the at least one machine learning operating parameter state; and changing the at least one machine learning operating parameter state from a first state to a second state based on receiving the network indication.

Aspect 6: The method of Aspect 5, wherein the at least one machine learning operating parameter state comprises at least one of a network setting associated with the machine learning component or a machine learning configuration associated with the machine learning component.

Aspect 7: The method of either of Aspects 5 or 6, wherein the UE capability information indicates the at least one machine learning operating parameter state based on an indication of at least one machine learning feature name.

Aspect 8: The method of Aspect 7, wherein the UE capability information indicates one or more machine learning parameter state, of the at least one machine learning operating parameter state, associated with a machine learning feature name.

Aspect 9: The method of any of Aspects 1-8, further comprising transmitting UE assistance information that indicates at least one machine learning operating parameter state that is configured to be changed based on a network indication.

Aspect 10: The method of Aspect 9, wherein the UE assistance information indicates the at least one machine learning operating parameter state based on including a request for a network indication associated with the at least one machine learning operating parameter state, the method further comprising: receiving, from the network node, a network indication associated with the at least one machine learning operating parameter state; and changing the at least one machine learning operating parameter state from a first state to a second state based on receiving the network indication.

Aspect 11: The method of any of Aspects 1-10, wherein the at least one machine learning component comprises a first machine learning component instantiated at the UE and a second machine learning component instantiated at the network node, wherein the second machine learning component is correlated with the first machine learning component.

Aspect 12: The method of Aspect 11, wherein a first set of model structures and a first set of parameter sets correspond to the first machine learning component, and wherein a second set of model structures and a second set of parameter sets correspond to the second machine learning component.

Aspect 13: The method of either of Aspects 11 or 12, wherein a first machine learning configuration corresponds to the first machine learning component, wherein a second machine learning configuration corresponds to the second machine learning configuration, wherein a first set of priorities corresponds to the first machine learning configuration, and wherein a second set of priorities corresponds to the second machine learning configuration.

Aspect 14: The method of Aspect 13, further comprising transmitting, to the network node, a UE indication of a configuration change associated with the first machine learning configuration.

Aspect 15: The method of Aspect 14, wherein the configuration information comprises a configuration associated with transmitting the indication.

Aspect 16: The method of either of Aspects 14 or 15, wherein the UE indication indicates at least one of a change in the first machine learning configuration, a change associated with an environment corresponding to the first machine learning configuration, or a change associated with an execution of the first machine learning configuration.

Aspect 17: The method of any of Aspects 13-16, further comprising receiving, from the network node, a network indication of a configuration change associated with the second machine learning configuration.

Aspect 18: The method of Aspect 17, wherein the UE capability information indicates at least one of cooperation support associated with the second machine learning configuration or that the network indication is to be transmitted based on the configuration change associated with the second machine learning configuration.

Aspect 19: The method of either of Aspects 17 or 18, further comprising changing the first machine learning configuration based on receiving the indication of the configuration change associated with the second machine learning configuration.

Aspect 20: The method of any of Aspects 1-19, further comprising receiving, from the network node, a network indication that indicates an activation operation associated with the at least one machine learning component, a deactivation operation associated with the at least one machine learning component, or a switch operation associated with the at least one machine learning component, wherein generating at least one of the first machine learning output or a second machine learning output comprises generating an output based at least in part on receiving the network indication.

Aspect 21: The method of Aspect 20, wherein the switch operation corresponds to at least one of a switch from a first model structure to a second model structure or a switch from a first parameter set to a second parameter set.

Aspect 22: The method of either of Aspects 20 or 21, further comprising: determining to change at least one machine learning operating parameter state associated with at least one machine learning component from a first state to a second state; and transmitting, to the network node, a UE indication associated with changing the at least one machine learning operating parameter state from the first state to the second state.

Aspect 23: The method of Aspect 22, wherein the determination to change the at least one machine learning operating parameter state is based on satisfaction of at least one of a network-configured change condition, a UE change condition, or a UE key performance indicator condition.

Aspect 24: The method of either of Aspects 22 or 23, wherein the UE indication comprises a request for the network indication.

Aspect 25: The method of any of Aspects 22-24, wherein transmitting the UE indication comprises transmitting a medium access control control element that includes the UE indication.

Aspect 26: The method of any of Aspects 22-24, wherein transmitting the UE indication comprises transmitting a radio resource control message that includes the UE indication.

Aspect 27: The method of any of Aspects 20-26, wherein receiving the network indication comprises receiving the network indication from a distributed unit.

Aspect 28: The method of any of Aspects 20-26, wherein receiving the network indication comprises receiving a medium access control control element that includes the network indication.

Aspect 29: The method of any of Aspects 20-26, wherein receiving the network indication comprises receiving a radio resource control message that includes the network indication.

Aspect 30: The method of any of Aspects 1-29, wherein the first machine learning output is based on an inference operation.

Aspect 31: The method of any of Aspects 1-29, wherein the first machine learning output is based on a training operation.

Aspect 32: A method of wireless communication performed by a network node, comprising: receiving, from a user equipment (UE), UE capability information associated with at least one machine learning component; transmitting, to the UE, configuration information associated with at the least one machine learning component, wherein the configuration information indicates at least one machine learning operating parameter state that is configured to be changed based on a UE indication; receiving, from the UE, a UE indication associated with the at least one machine learning operating parameter state; and performing at least one machine learning operation based on receiving the UE indication.

Aspect 33: The method of Aspect 32, wherein performing the at least one machine learning operation comprises at least one of: changing the at least one machine learning operating parameter state from a first state to a second state based on receiving the UE indication; generating a machine learning output based on the machine learning component; or performing a communication task based on the machine learning output.

Aspect 34: The method of either of Aspects 32 or 33, wherein performing the at least one machine learning operation comprises providing an indication, to an additional network node, to perform at least one additional machine learning operation.

Aspect 35: The method of Aspect 34, wherein the indication to perform the at least one additional machine learning operation comprises at least one of: an indication to change the at least one machine learning operating parameter state from a first state to a second state based; an indication to generate a machine learning output based on the machine learning component; or an indication to perform a communication task based on the machine learning output.

Aspect 36: The method of any of Aspects 32-35, wherein the at least one machine learning component comprises a first machine learning component instantiated at the UE and a second machine learning component instantiated at the network node, wherein the second machine learning component is correlated with the first machine learning component.

Aspect 37: The method of Aspect 36, wherein a first set of model structures and a first set of parameter sets correspond to the first machine learning component, and wherein a second set of model structures and a second set of parameter sets correspond to the second machine learning component.

Aspect 38: The method of either of Aspects 36 or 37, wherein a first machine learning configuration corresponds to the first machine learning component, wherein a second machine learning configuration corresponds to the second machine learning configuration, wherein a first set of priorities corresponds to the first machine learning configuration, and wherein a second set of priorities corresponds to the second machine learning configuration.

Aspect 39: The method of Aspect 38, wherein the at least one machine learning operating parameter state comprises a configuration change associated with the second machine learning configuration.

Aspect 40: The method of any of Aspects 36-39, wherein the configuration information comprises a configuration associated with transmitting the indication.

Aspect 41: The method of any of Aspects 36-40, wherein the UE indication indicates at least one of a change in the first machine learning configuration, a change associated with an environment corresponding to the first machine learning configuration, or a change associated with an execution of the first machine learning configuration.

Aspect 42: The method of any of Aspects 36-41, changing the at least one machine learning operating parameter state from a first state to a second state comprises changing the second machine learning configuration based on receiving the UE indication of the configuration change associated with first second machine learning configuration.

Aspect 43: The method of any of Aspects 36-42, further comprising transmitting, to the UE, a network indication of a configuration change associated with the second machine learning configuration.

Aspect 44: The method of Aspect 43, wherein the UE capability information indicates at least one of cooperation support associated with the second machine learning configuration or that the network indication is to be transmitted based on the configuration change associated with the second machine learning configuration.

Aspect 45: The method of either of Aspects 43 or 44, wherein the network indication that indicates an activation operation associated with the first machine learning configuration, a deactivation operation associated with the first machine learning configuration, or a switch operation associated with the first machine learning configuration.

Aspect 46: The method of Aspect 45, wherein the switch operation corresponds to at least one of a switch from a first model structure to a second model structure or a switch from a first parameter set to a second parameter set.

Aspect 47: The method of either of Aspects 45 or 46, further comprising receiving, from the UE, a UE indication associated with changing the first machine learning configuration from a first state to a second state.

Aspect 48: The method of Aspect 47, wherein the UE indication comprises a request for the network indication.

Aspect 49: The method of either of Aspects 47 or 48, wherein receiving the UE indication comprises receiving a medium access control control element that includes the UE indication.

Aspect 50: The method of either of Aspects 47 or 48, wherein receiving the UE indication comprises receiving a radio resource control message that includes the UE indication.

Aspect 51: The method of any of Aspects 36-49, wherein transmitting the network indication comprises transmitting the network indication using a distributed unit.

Aspect 52: The method of any of Aspects 36-49, wherein transmitting the network indication comprises transmitting a medium access control control element that includes the network indication.

Aspect 53: The method of any of Aspects 36-49, wherein transmitting the network indication comprises transmitting a radio resource control message that includes the network indication.

Aspect 54: The method of any of Aspects 32-53, wherein performing the at least one machine learning operation comprises performing an inference operation.

Aspect 55: The method of any of Aspects 32-53, wherein performing the at least one machine learning operation comprises performing a training operation.

Aspect 56: An apparatus for wireless communication at a device, comprising a processor; memory coupled with the processor; and instructions stored in the memory and executable by the processor to cause the apparatus to perform the method of one or more of Aspects 1-31.

Aspect 57: A device for wireless communication, comprising a memory and one or more processors coupled to the memory, the one or more processors configured to perform the method of one or more of Aspects 1-31.

Aspect 58: An apparatus for wireless communication, comprising at least one means for performing the method of one or more of Aspects 1-31.

Aspect 59: A non-transitory computer-readable medium storing code for wireless communication, the code comprising instructions executable by a processor to perform the method of one or more of Aspects 1-31.

Aspect 60: A non-transitory computer-readable medium storing a set of instructions for wireless communication, the set of instructions comprising one or more instructions that, when executed by one or more processors of a device, cause the device to perform the method of one or more of Aspects 1-31.

Aspect 61: An apparatus for wireless communication at a device, comprising a processor; memory coupled with the processor; and instructions stored in the memory and executable by the processor to cause the apparatus to perform the method of one or more of Aspects 32-55.

Aspect 62: A device for wireless communication, comprising a memory and one or more processors coupled to the memory, the one or more processors configured to perform the method of one or more of Aspects 32-55.

Aspect 63: An apparatus for wireless communication, comprising at least one means for performing the method of one or more of Aspects 32-55.

Aspect 64: A non-transitory computer-readable medium storing code for wireless communication, the code comprising instructions executable by a processor to perform the method of one or more of Aspects 32-55.

Aspect 65: A non-transitory computer-readable medium storing a set of instructions for wireless communication, the set of instructions comprising one or more instructions that, when executed by one or more processors of a device, cause the device to perform the method of one or more of Aspects 32-55.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit, to a network node, UE capability information associated with at least one machine learning component, wherein the UE capability information indicates at least one machine learning operating parameter state associated with the at least one machine learning component based on an indication of at least one machine learning feature name;
      receive, from the network node and based on the UE capability information, configuration information corresponding to the at least one machine learning component;
      generate a first machine learning output based on the at least one machine learning component; and
      perform a communication task based on the first machine learning output.

2. The UE of claim 1,
   wherein the one or more processors are further configured to change the at least one machine learning operating parameter state associated with the at least one machine learning component.

3. The UE of claim 2,
   wherein the at least one machine learning operating parameter state comprises at least one of a network setting or a machine learning configuration.

4. The UE of claim 2,
   wherein the one or more processors are further configured to receive, from the network node, a change indication that indicates a change associated with a plurality of machine learning operating parameters including the at least one machine learning operating parameter.

5. The UE of claim 1,
   wherein the at least one machine learning operating parameter state is configured to be changed based on a network indication, and wherein the one or more processors are further configured to:
      receive, from the network node, the network indication; and
      change the at least one machine learning operating parameter state from a first state to a second state based on the network indication, wherein the at least one machine learning operating parameter state comprises at least one of a network setting associated with the machine learning component or a machine learning configuration associated with the machine learning component.

6. The UE of claim 1,
   wherein the UE capability information indicates one or more machine learning parameter states, of the at least one machine learning operating parameter state, associated with the at least one machine learning feature name.

7. The UE of claim 1,
wherein the one or more processors are further configured to transmit UE assistance information that indicates the at least one machine learning operating parameter state that is configured to be changed based on a network indication.

8. The UE of claim 7,
wherein the UE assistance information indicates the at least one machine learning operating parameter state based on including a request for the network indication, wherein the one or more processors are further configured to:
receive, from the network node, the network indication; and
change the at least one machine learning operating parameter state from a first state to a second state based on the network indication.

9. The UE of claim 1,
wherein the at least one machine learning component comprises a first machine learning component instantiated at the UE and a second machine learning component instantiated at the network node, wherein the second machine learning component is correlated with the first machine learning component, wherein a first set of model structures and a first set of parameter sets correspond to the first machine learning component, and wherein a second set of model structures and a second set of parameter sets correspond to the second machine learning component.

10. The UE of claim 9,
wherein a first machine learning configuration corresponds to the first machine learning component, wherein a second machine learning configuration corresponds to the second machine learning configuration, wherein a first set of priorities corresponds to the first machine learning configuration, and wherein a second set of priorities corresponds to the second machine learning configuration.

11. The UE of claim 10,
wherein the one or more processors are further configured to transmit, to the network node, a UE indication of a configuration change associated with the first machine learning configuration, wherein the UE indication indicates at least one of a change in the first machine learning configuration, a change associated with an environment corresponding to the first machine learning configuration, or a change associated with an execution of the first machine learning configuration.

12. The UE of claim 11,
wherein the one or more processors are further configured to:
receive, from the network node, a network indication of a configuration change associated with the second machine learning configuration; and
change the first machine learning configuration based on the network indication.

13. The UE of claim 12,
wherein the UE capability information indicates at least one of cooperation support associated with the second machine learning configuration or that the network indication is to be transmitted based on the configuration change associated with the second machine learning configuration.

14. The UE of claim 1,
wherein the one or more processors are further configured to receive, from the network node, a network indication that indicates an activation operation associated with the at least one machine learning component, a deactivation operation associated with the at least one machine learning component, or a switch operation associated with the at least one machine learning component,
wherein the one or more processors, to generate at least one of the first machine learning output or a second machine learning output, are configured to generate an output based at least in part on the network indication.

15. The UE of claim 14,
wherein the switch operation corresponds to at least one of a switch from a first model structure to a second model structure or a switch from a first parameter set to a second parameter set.

16. The UE of claim 15,
wherein the one or more processors are further configured to:
determine to change at least one machine learning operating parameter state associated with the at least one machine learning component from a first state to a second state; and
transmit, to the network node, a UE indication associated with changing the at least one machine learning operating parameter state from the first state to the second state.

17. The UE of claim 16,
wherein the determination to change the at least one machine learning operating parameter state is based on satisfaction of at least one of a network-configured change condition, a UE change condition, or a UE key performance indicator condition.

18. The UE of claim 1,
wherein the first machine learning output is based on an inference operation.

19. The UE of claim 1,
wherein the first machine learning output is based on a training operation.

20. A network node for wireless communication, comprising:
one or more memories; and
one or more processors, coupled to the one or more memories, configured to:
receive, from a user equipment (UE), UE capability information associated with at least one machine learning component, wherein the UE capability information indicates at least one machine learning operating parameter state associated with at least one machine learning component based on an indication of at least one machine learning feature name;
transmit, to the UE, configuration information associated with the at the least one machine learning component, wherein the configuration information indicates that the at least one machine learning operating parameter state is configured to be changed based on a UE indication;
receive, from the UE, the UE indication; and
perform at least one machine learning operation based on the UE indication.

21. The network node of claim 20,
wherein the one or more processors, to perform the at least one machine learning operation, are configured to:

change the at least one machine learning operating parameter state from a first state to a second state based on the UE indication;
generate a machine learning output based on the machine learning component; or
perform a communication task based on the machine learning output.

22. The network node of claim 20,
wherein the one or more processors, to perform the at least one machine learning operation, are configured to provide an indication, to an additional network node, to perform at least one additional machine learning operation, wherein the indication to perform the at least one additional machine learning operation comprises at least one of:
an indication to change the at least one machine learning operating parameter state from a first state to a second state based on the UE indication;
an indication to generate a machine learning output based on the machine learning component; or
an indication to perform a communication task based on the machine learning output.

23. The network node of claim 20,
wherein the at least one machine learning component comprises a first machine learning component instantiated at the UE and a second machine learning component instantiated at the network node, wherein the second machine learning component is correlated with the first machine learning component, wherein a first set of model structures and a first set of parameter sets correspond to the first machine learning component, and wherein a second set of model structures and a second set of parameter sets correspond to the second machine learning component.

24. The network node of claim 23,
wherein the one or more processors are further configured to transmit, to the UE, a network indication of a configuration change associated with the second machine learning component.

25. The network node of claim 20,
wherein the one or more processors, to perform the at least one machine learning operation, are configured to perform at least one of an inference operation or a training operation.

26. A method of wireless communication performed by a user equipment (UE), comprising:
transmitting, to a network node, UE capability information associated with at least one machine learning component, wherein the UE capability information indicates at least one machine learning operating parameter state associated with the at least one machine learning component based on an indication of at least one machine learning feature name;
receiving, from the network node and based on the UE capability information, configuration information corresponding to the at least one machine learning component;
generating a first machine learning output based on the at least one machine learning component; and
performing a communication task based on the first machine learning output.

27. The method of claim 26, further comprising
changing the at least one machine learning operating parameter state associated with the at least one machine learning component, wherein the at least one machine learning operating parameter state comprises at least one of a network setting or a machine learning configuration.

28. The method of claim 26, wherein the at least one machine learning operating parameter state comprises at least one of a network setting or a machine learning configuration.

29. A method of wireless communication performed by a network node, comprising:
receiving, from a user equipment (UE), UE capability information associated with at least one machine learning component, wherein the UE capability information indicates at least one machine learning operating parameter state associated with at least one machine learning component based on an indication of at least one machine learning feature name;
transmitting, to the UE, configuration information associated with at the least one machine learning component, wherein the configuration information indicates that the at least one machine learning operating parameter state is configured to be changed based on a UE indication;
receiving, from the UE, the UE indication; and
performing at least one machine learning operation based on receiving the UE indication.

30. The method of claim 29,
wherein performing the at least one machine learning operation comprises at least one of:
changing the at least one machine learning operating parameter state from a first state to a second state based on receiving the UE indication;
generating a machine learning output based on the machine learning component; or
performing a communication task based on the machine learning output.

* * * * *